United States Patent [19]

Kliman et al.

[11] Patent Number: 5,793,138
[45] Date of Patent: Aug. 11, 1998

[54] FABRICATION OF INDUCTION MOTORS

[75] Inventors: Gerald Burt Kliman, Schenectady; Clive William Reed, Scotia, both of N.Y.

[73] Assignee: General Electric Company, Schenectady, N.Y.

[21] Appl. No.: 863,149

[22] Filed: May 27, 1997

Related U.S. Application Data

[62] Division of Ser. No. 317,077, Oct. 3, 1994, Pat. No. 5,680,692.

[51] Int. Cl.⁶ .................................................. H02K 15/02
[52] U.S. Cl. ........................... 310/211; 310/42; 310/44; 29/596
[58] Field of Search ........................ 310/42, 44, 43, 310/45, 211, 212, 215, 154; 29/596, 598, 608

[56] References Cited

U.S. PATENT DOCUMENTS

| | | | |
|---|---|---|---|
| 1,396,033 | 11/1921 | Francis | 29/596 X |
| 1,994,534 | 3/1935 | Robinson | 29/608 X |
| 2,387,073 | 10/1945 | Horlacher | 29/598 X |
| 3,212,170 | 10/1965 | Marshall | 29/598 X |
| 3,443,136 | 5/1969 | Freeman et al. | 29/596 X |
| 3,808,135 | 4/1974 | Wiegel et al. | 29/596 |
| 3,848,331 | 11/1974 | Pavlik et al. | 29/596 |
| 3,872,334 | 3/1975 | Loubier | 310/43 |
| 4,947,065 | 8/1990 | Ward et al. | 310/44 |
| 5,004,577 | 4/1991 | Ward | 764/12 |
| 5,015,982 | 5/1991 | Skinner et al. | 336/83 X |
| 5,121,021 | 6/1992 | Ward | 324/252 |
| 5,210,493 | 5/1993 | Schroeder et al. | 324/252 |
| 5,211,503 | 5/1993 | Ward et al. | 310/156 |
| 5,211,896 | 5/1993 | Ward et al. | 264/126 |
| 5,221,503 | 6/1993 | Ward et al. | |
| 5,498,918 | 3/1996 | Weihrauch | 310/261 |
| 5,680,692 | 10/1997 | Kliman et al. | 29/596 |

*Primary Examiner*—Steven L. Stephan
*Assistant Examiner*—Judson H. Jones
*Attorney, Agent, or Firm*—Ann M. Agosti; Marvin Snyder

[57] ABSTRACT

A method for fabricating a motor component comprises forming a plurality of substantially parallel electrical current conductors and molding magnetic flux conductive material around at least a portion of each of the plurality of electrical current conductors. In one embodiment the motor component comprises a stator, and the step of forming a plurality of slot liners comprises positioning multi-turn wire coils on a mandrel. In another embodiment, the motor component comprises a rotor, and the step of forming the plurality of substantially parallel electrical current conductors comprises fabricating a rotor cage.

16 Claims, 7 Drawing Sheets

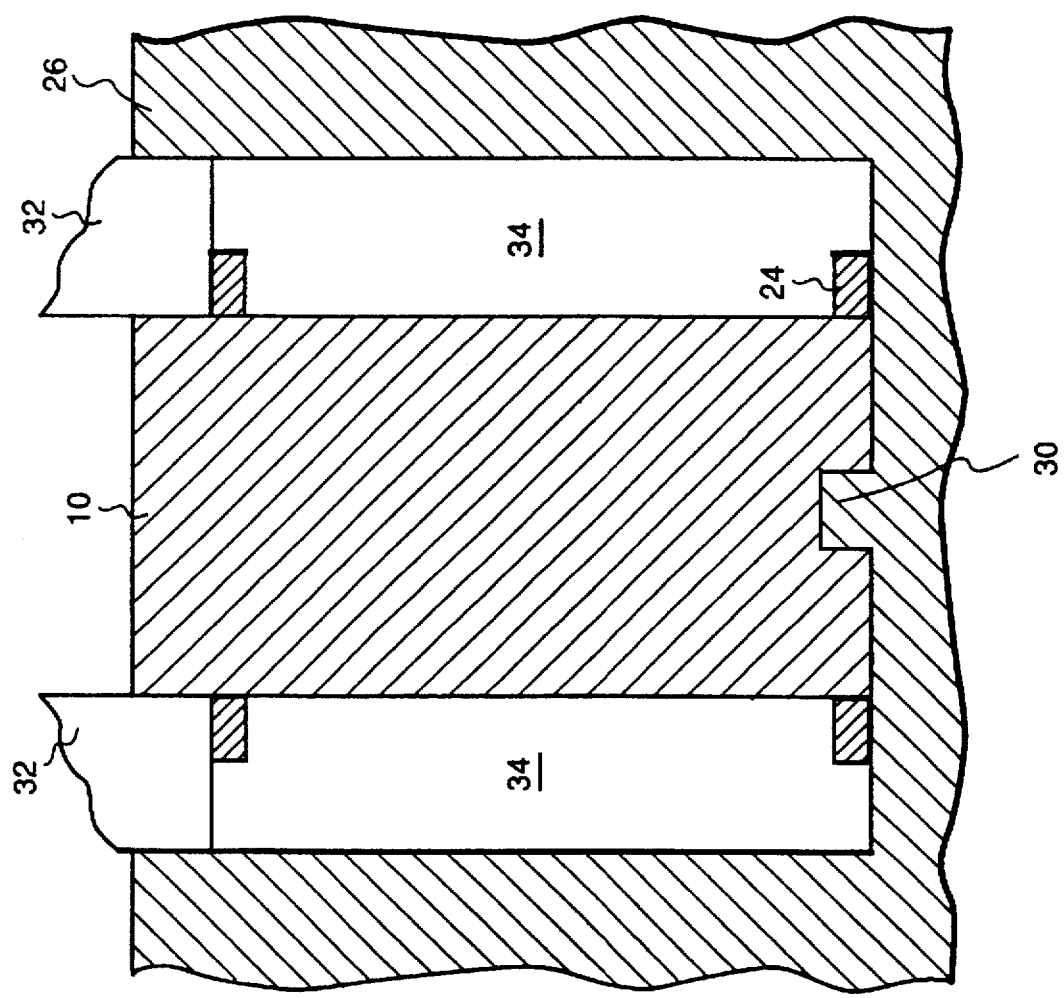

FABRICATION OF INDUCTION MOTORS

This application is a division of application Ser. No. 08/317,077, filed Oct. 3, 1994, now U.S. Pat. No. 5,630,692.

BACKGROUND OF THE INVENTION

1. Field of the Invention

This invention relates generally to induction motors, and, more particularly, to the fabrication of induction motor stators and rotors.

2. Description of the Related Art

A conventional induction motor is generally fabricated by punching slots in individual steel sheet laminations and stacking the laminations to form a semi-rigid structure for conducting magnetic flux as either a stator or a rotor. A stator is fabricated by inserting slot liners or other insulation to form ground isolation and then winding enameled wires in the slots. A rotor is fabricated by positioning the laminations in a mold form and injecting molten aluminum under pressurized conditions to fill the slots and form the rotor windings and end rings. On large motors a rotor cage is sometimes formed by driving bars of specific cross sections to match the slots into the assembled stack. The bars are then attached to end rings by brazing or welding.

These conventional techniques, which have not changed significantly in the past seventy-five years, have a number of limitations. For example, the automated stator winding process, as well as hand insertion of windings, is extremely stressful, resulting in a large number of defects. Additionally, the process of punching individual sheets results in about one third to one half of the sheet material becoming scrap metal. Furthermore, the copper area of the windings typically occupies only about a third of the available stator slot area. In rotor fabrication, it would be desirable to replace aluminum with copper to achieve lower slip losses, but the higher temperature required for injecting molten copper and the tendency of copper to alloy with steel to form eutectics (thereby eroding or destroying the laminations) makes the process risky, difficult, and expensive. In addition the conventional method of rotor fabrication results in considerable contact between the laminations and the rotor cage which leads to stray load losses that are difficult to predict or to control.

SUMMARY OF THE INVENTION

Accordingly, an object of the invention is to provide a fabrication process which results in induction motors having lower losses than conventional induction motors at comparable or lower costs.

Briefly, in accordance with a preferred embodiment of the invention, a method for fabricating a motor component comprises forming a plurality of substantially parallel electrical current conductors and molding magnetic flux conductive material around at least a portion of each of the plurality of electrical current conductors. The term "substantially parallel" means that each of the plurality of current conductors remains approximately equidistant from the others and includes, for example, skewed current conductors within a stator or rotor. In a more specific embodiment, the motor component comprises a stator, and the step of forming the plurality of substantially parallel electrical conductors includes positioning multi-turn wire coils on a mandrel. In another more specific embodiment, the motor component comprises a rotor, and the step of forming the plurality of substantially parallel electrical current conductors includes fabricating a rotor cage.

In accordance with another embodiment of the invention, a motor component comprises a plurality of substantially parallel electrical current conductors and magnetic flux conductive material molded around at least a portion of each of the plurality of electrical current conductors. In a more specific embodiment, each of the electrical current conductors includes at least a portion of a multi-turn wire coil. In another more specific embodiment, each of the electrical current conductors comprises a rotor bar and the motor component further comprises two end rings coupled to the rotor bars.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings, where like numerals represent like components, in which:

FIG. 9 is a view similar to that of FIG. 8, further showing molding material in the mold form;

DETAILED DESCRIPTION OF A PREFERRED EMBODIMENT OF THE INVENTION

Figure 1:
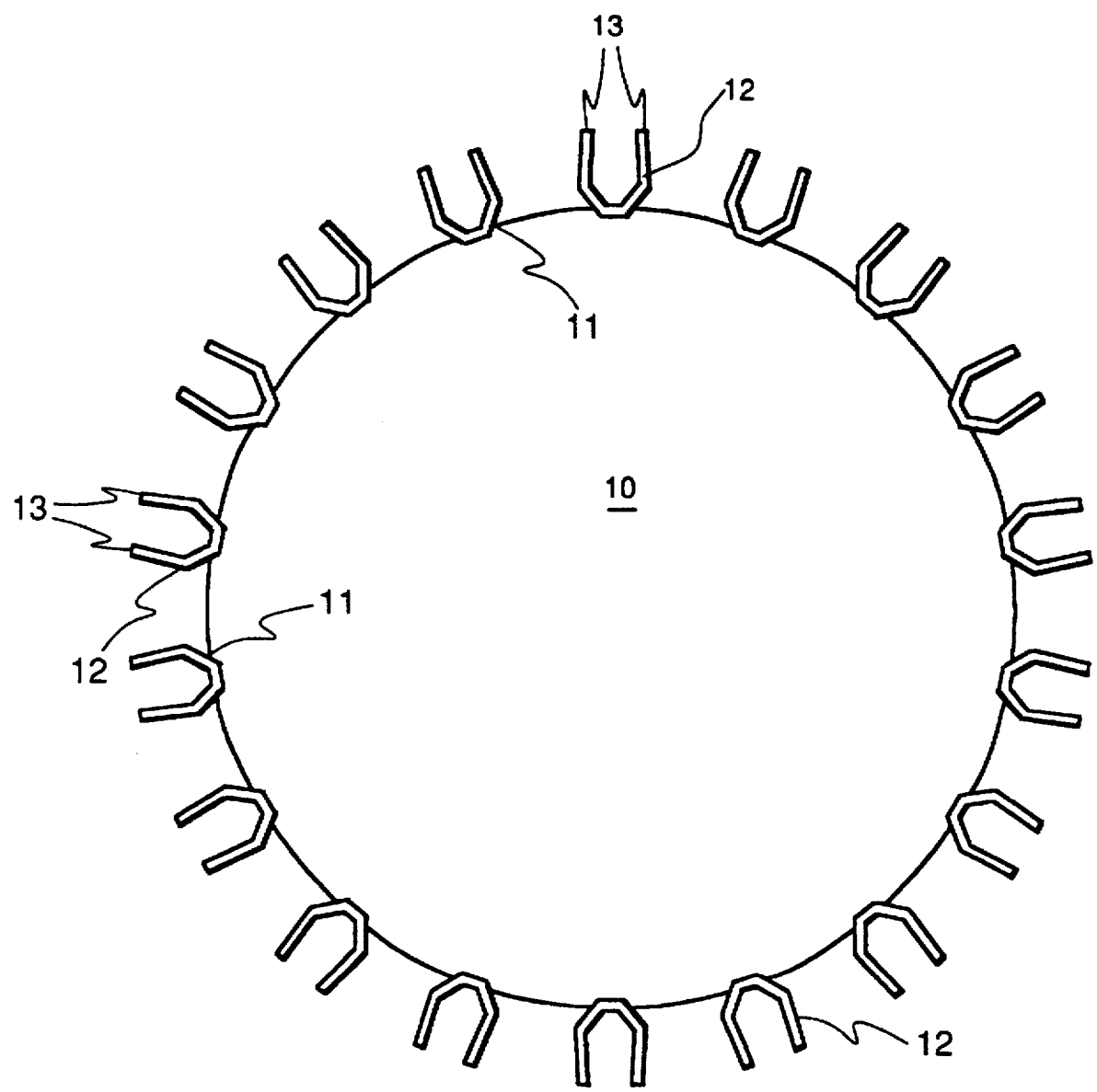
FIG. 1 is a sectional view of a mandrel and plurality of slot liners for use in a stator.

In the present invention, the conventional method of fabrication is reversed, and a structure of electrical current conductors is fabricated around which the magnetic flux conductors are then molded. This technique is useful for both stators and rotors.

Fabrication of the stator begins by winding the coils. A number of methods can be used to wind the coils. For example, in the embodiment shown in FIG. 1, a mandrel 10 is encircled by a plurality of slot liners 12. The mandrel may comprise any suitable structural material such as steel, for example. Each slot liner preferably has two arms 13 defining at least one open end. The slot liners comprise conventional slot liner material that is electrically and magnetically insulating such as, for example, Mylar polyethylene terephthalate film or Nomex polyamide paper (Mylar and Nomex are trademarks of E.I. duPont de Nemours and Co.). Preferably mandrel 10 includes grooves 11 which aid in alignment and positioning of the slot liners. As shown in FIG. 2, the slot liners can have one or more tabs 15 for insertion into corresponding openings (not shown) in the mandrel to hold the slot liners in place. The use of grooves and tabs is for example only; any appropriate manner of securing the slot liners may be used.

Figure 2:
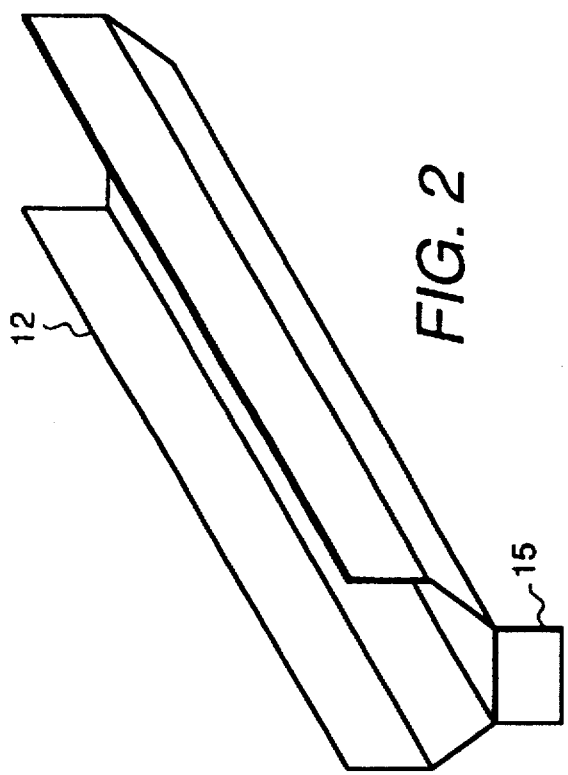
FIG. 2 is a perspective view of a slot liner useful in the embodiment of FIG. 1.
Figure 3:
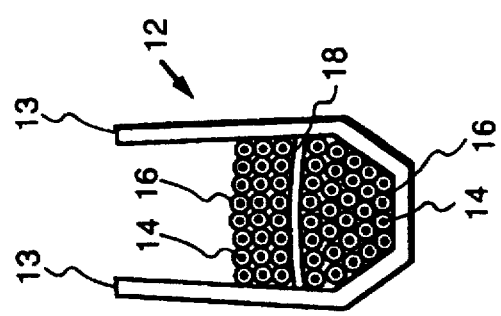
FIG. 3 is a sectional view of one of the slot liners of FIG. 1, further including wound wires.

FIG. 3 is a sectional view of one of the slot liners 12 of FIG. 1, further including wound wires 14 having respective coatings 16. The wires typically comprise an electrically conductive material such as copper or aluminum. The wire coating material comprises an electrically insulative material. In one embodiment, the coating comprises a self-bonding insulation such as, for example, a polyamide or a polyamidimide which bonds when heated. In another embodiment, the coating can be a standard enamel coating with an overcoating that bonds, upon heating, to adjacent turns. In still another embodiment, the wires can be bonded in a separate step by conventionally impregnating the wire coatings with a varnish such as an epoxy, polyester, or polyesterimide, or with a low viscosity resin that can be cured in position.

Before bonding, the wires are wound into multi-turn coils. Each coil is inserted into the open ends of two respective slot liners. In a preferred embodiment, each slot liner includes portions of two coils separated by an insulative divider 18. The coils can be inserted in any appropriate configuration including for example as either lap windings or concentric windings. After the coils are positioned, the wires are bonded in the desired shape.

Figure 4:
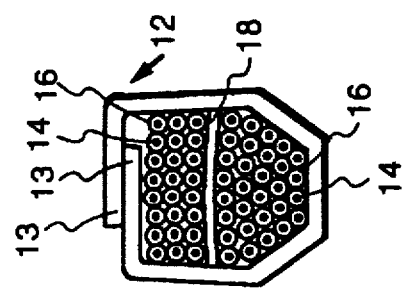
FIG. 4 is a view of the slot liner of FIG. 3 with folded arms.

FIG. 4 is a view of the slot liner 12 of FIG. 1 with folded arms 13 which surround and thus further insulate wires 14. Slot liners 12 are preferably angled as shown in FIGS. 1–4 to form slot overhangs in the stator mold. Folding over of the slot liner arms (as opposed to face-butting) also serves to lengthen the current leakage paths to the later-fabricated molded core. The mandrel is not necessary for the technique of using slot liners; the slot liners can be held in place in any appropriate manner for inserting coils.

Figure 5:
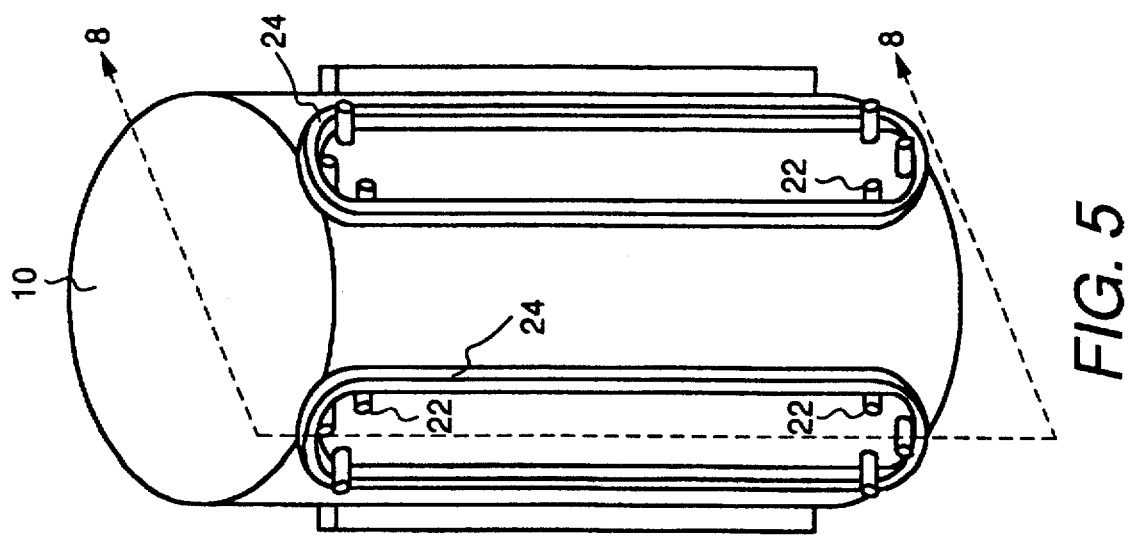
FIG. 5 is a perspective view of a mandrel having wires wound around removable pins.
Figure 6:
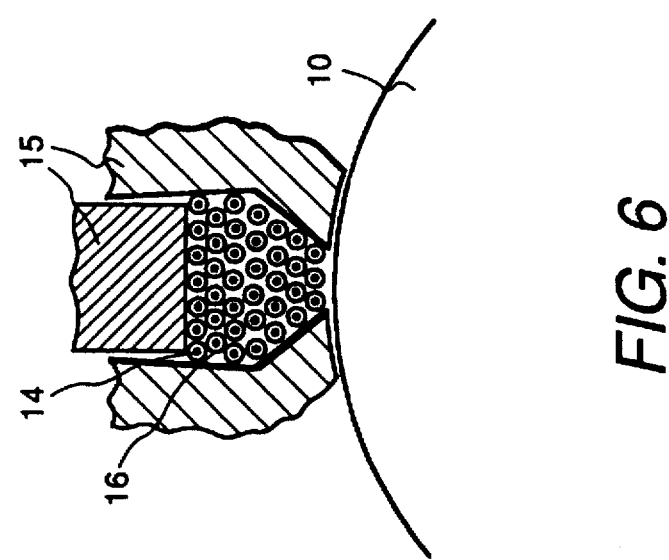
FIG. 6 is a sectional view of a heating element for bonding wound wires.

A second method for forming stator coils is shown in FIG. 5, which is a perspective view of a mandrel 10 having wires wound in coils 24. Computer directed wire laying machines similar to those now used for making wiring harnesses can be used. Removable pins 22 can be used on the mandrel to facilitate the winding process, if necessary. The pins, which are removed before molding, may be comprised of a suitable material such as steel, for example. As discussed above, the wires can have self-bonding insulative coatings or be impregnated with a varnish. Once the coils are appropriately positioned, a series of heated dies can be used to form the desired cross section and position of coils. One example of a heated die 15 surrounding wires 14 is shown in FIG. 6.

Figure 7:
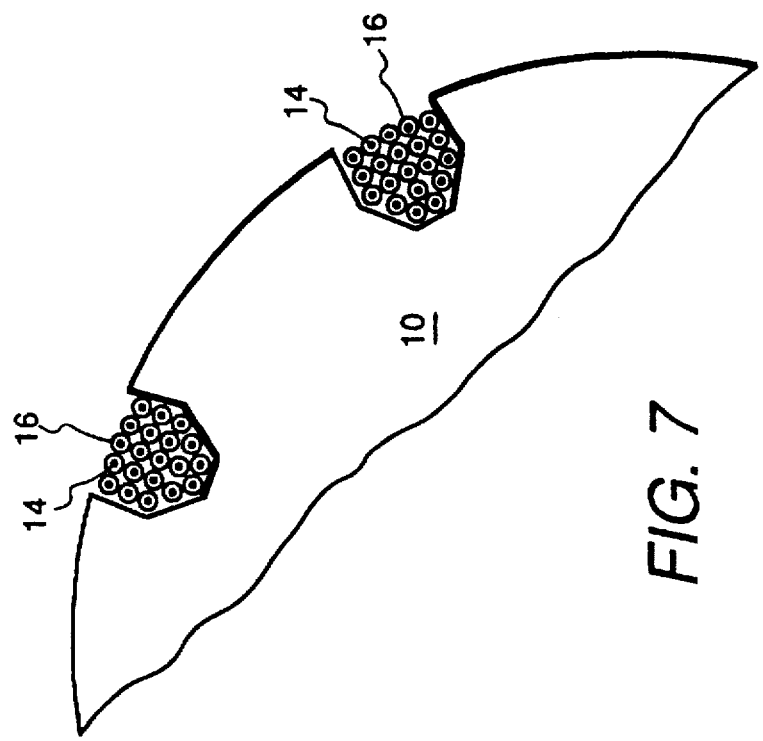
FIG. 7 is a partial sectional view of a form having grooves for pre-winding of coils.

Alternatively the coils may be loosely wound on forms, as shown in FIG. 7, and later transferred to the mandrel. After a coil is wound, it can be bonded while still in the winding form and then removed from the form for placement on a mandrel. This embodiment can result in reduced cost and is especially applicable in low voltage motors. If an overhang is desired, a layer of binder (not shown) may be used. After the coils are inserted and the wires are bonded, the coils are removed from the slots.

After coils are in position on a mandrel, slot liner material may be applied either in the form of a powder or as sheets of material, depending on the application required. Slot liners are not required for all applications.

Figure 8:
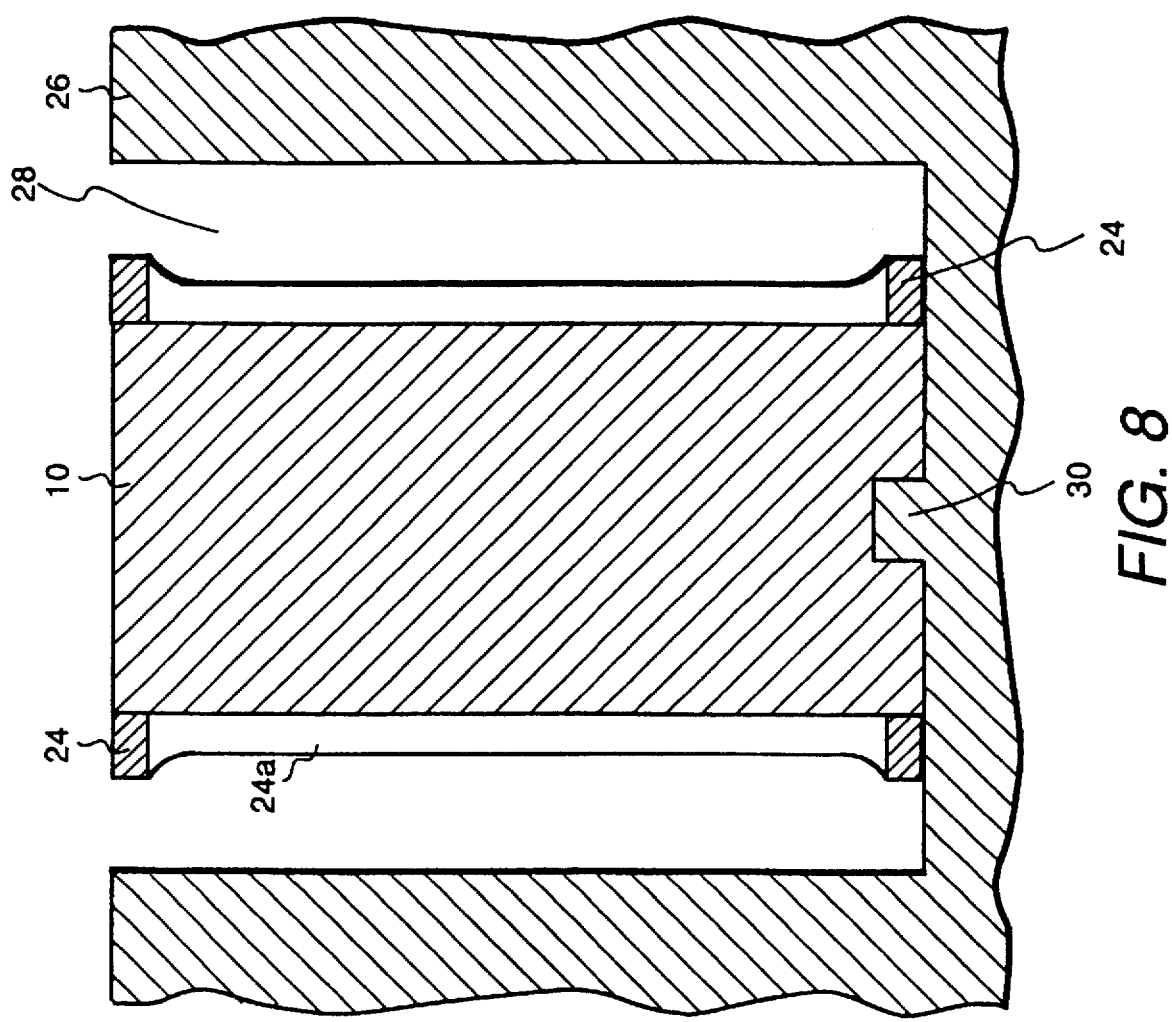
FIG. 8 is a sectional side view of the mandrel and wires of FIG. 5 positioned in a mold form.

FIG. 8 is a sectional side view of mandrel 10 and coils 24 of FIG. 5 positioned in a mold form 26. Although a cross section of FIG. 5 is shown, the structure of FIG. 8 can be used regardless of how the stator coils are formed. If the coils are formed without a mandrel, the coils are positioned around a mandrel prior to molding. The mandrel can either be solid or hollow. For simplicity, the optional slot liners are not shown.

In one embodiment, the mold form has a cylindrical locating pin 30 and the mandrel is shaped so as to fit on the cylindrical locating pin to aid in alignment. The mold form comprises a material such as hardened steel, for example. Prior to positioning the mandrel in the mold form, a release agent is sprayed on the mold form to ease in the later removal of the molded stator. The release agent may comprise any appropriate mold release agent and in one embodiment comprises a silicone oil from General Electric Company, for example. The area 28 between the mandrel and the mold form is the area in which molding material is added. In the cross sectional view, only a portion of the coil 24 is sectioned; the other portion 24a of the coil would be visible at a side angle.

FIG. 9 is a view similar to that of FIG. 8, further showing molding material 34 in mold form 26. In one embodiment the molding material is an iron powder composite available from Hoeganaes Corporation, of Riverton, N.J., comprising powdered iron coated with a binder of Ultem polyetherimide resin (Ultem is a registered trademark of General Electric Company), and the molding occurs with a pre-heated mold at a temperature of about 310° C., a pre-heated powder at a temperature of about 200° C. which is poured into the mold, and a pressure of about 100,000 psi. Pressure can be created by applying a piston 32 over the molding material as the material is directed into the mold. The pressure should be sufficient to distribute the molding material between the windings so that portion 24a (as shown in FIG. 8) would not be visible in the view of FIG. 9. The binder is not required if the particles can be satisfactorily compacted in the mold without a binder.

Other materials which may be used for molding include iron flakes, steel powder, and steel flakes, for example. Mixtures of steel or iron with glass fibers can be used for strengthening the molding material. Other examples of binders include epoxies and other thermosetting materials, for example. After molding, the completed stator may be removed from the molding die and slid off the mandrel.

Figure 10:
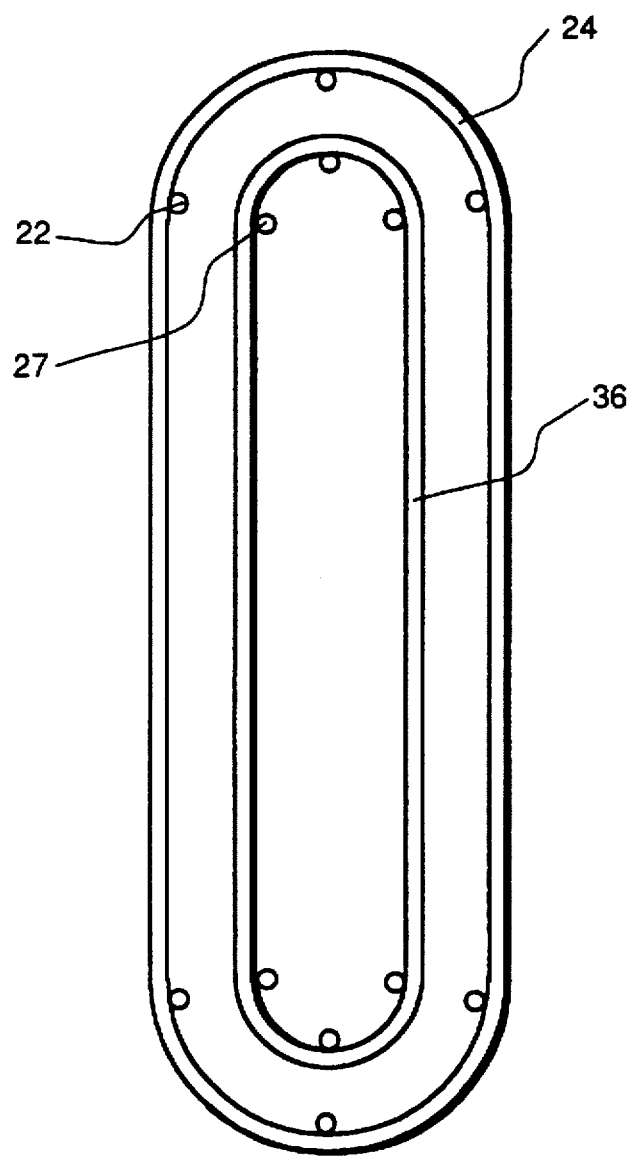
FIG. 10 is a view of an alternate embodiment for the wound wires shown in FIG. 5.

FIG. 10 is a front view of an alternate embodiment for the coils 24 shown in FIG. 5. In FIG. 10, the windings are concentric with coil 24 being an outer coil surrounding an inner coil 36.

Figure 11:
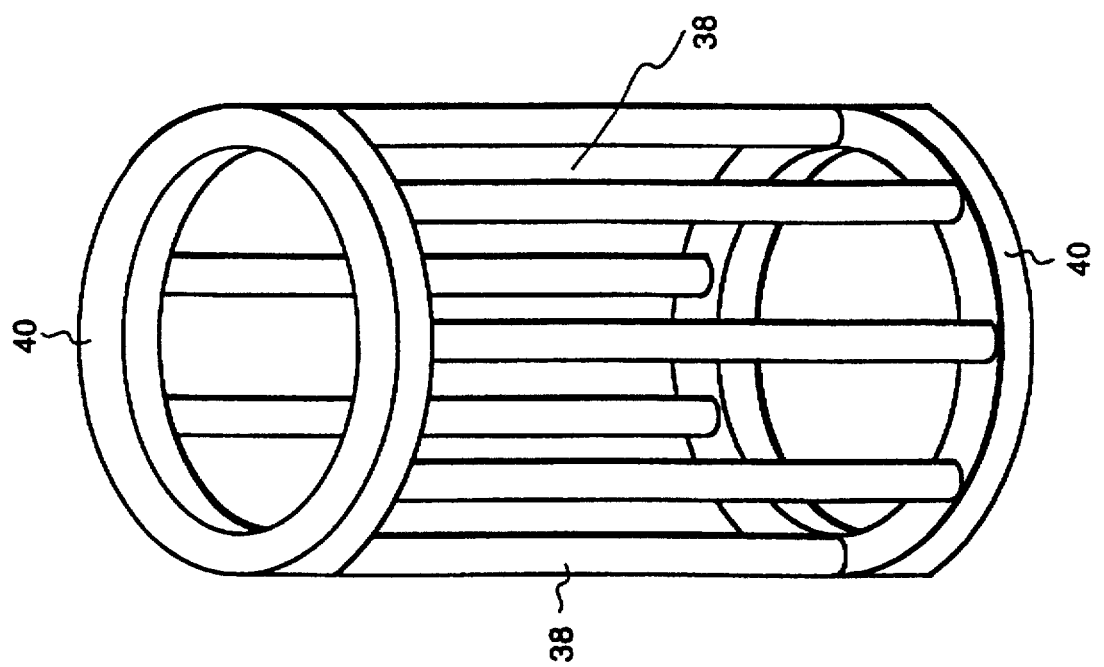
FIG. 11 is a perspective view of pre-fabricated rotor bars and rotor endrings.

FIG. 11 is a perspective view of pre-fabricated rotor cage with bars 38 coupled to endrings 40. The rotor cage can be fabricated by attaching rotor bars to endrings (by brazing, welding, or force fitting, for example) or by molding an integral assembly. The rotor cage may comprise any appropriate electrically conductive material, including, for example, copper or aluminum, depending on the efficiency desired and the intended application. The opportunity to mold copper before the application of magnetic material (and thus achieve reduced slip losses) is useful because molding copper in conventional rotor laminations is difficult. Molding an integral rotor cage can be done by any of several known processes including investment casting, injection molding, lost wax molding, and lost Styrofoam™ polystyrene plastic molding. Skewed or unskewed cages are equally easy to produce using this technique by forming a skewed or unskewed mold.

After the rotor cage is fabricated, the surfaces can be coated with insulation, oxidized, or anodized, if needed, to ensure that no ohmic contact will be formed between the rotor cage and the magnetic rotor material.

Figure 12:
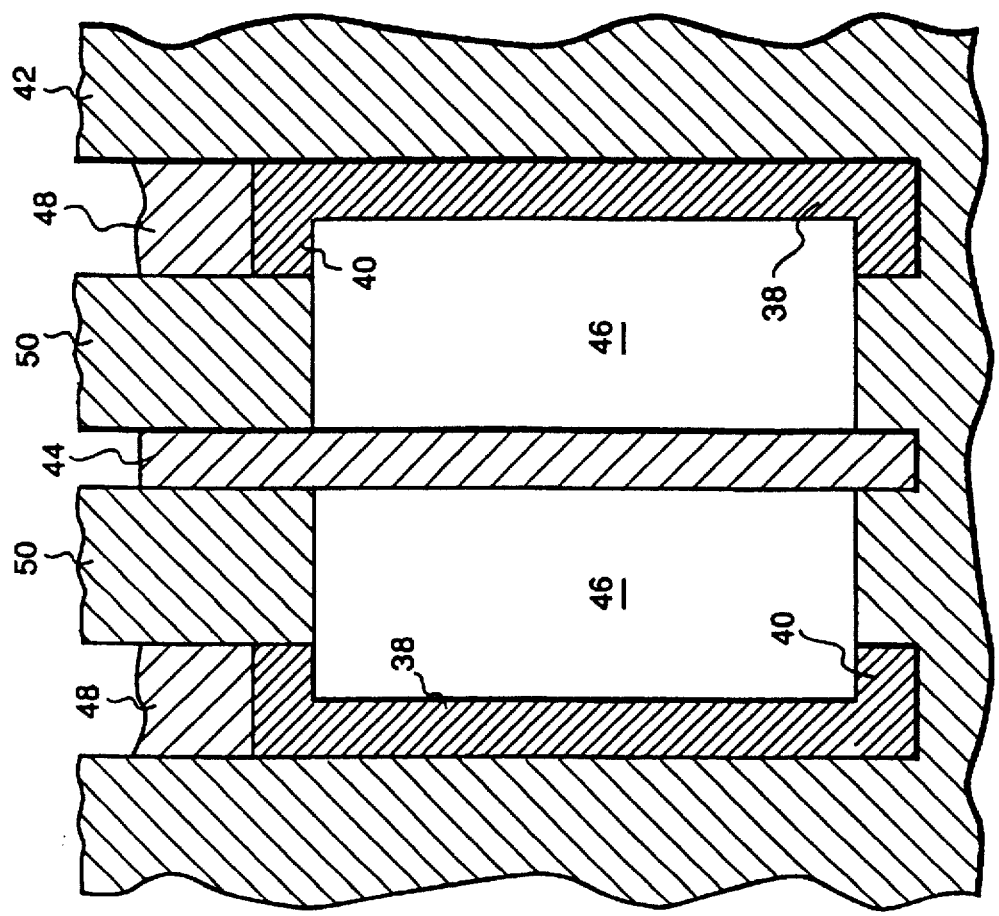
FIG. 12 is a sectional side view of the rotor bars and endrings in a mold form.

FIG. 12 is a sectional side view of rotor bars 38 and endrings 40 in a mold form 42. A mold release material can be coated on the mold form prior to positioning the rotor cage, as discussed with respect to the stator. A bar 44 is present in the middle of the rotor cage. Bar 44 can serve as a shaft which is used as the rotor axle. Alternatively, bar 44 can be an integral portion of the mold form.

The magnetic structure is formed using magnetic flux conductive particles comprising a material such as iron or steel in an appropriate binder as discussed with respect to the stator. When rotor cages are molded, features such as slot overhangs, various combinations of multiple cages, and odd slot shapes can be molded to give different starting or running characteristics.

Pressure to distribute molding material 42 throughout the mold can again be obtained from a piston 50. Before applying pressure, however, support piece 48 should be positioned over the exposed end ring 40 so that pressure applied on the molding material does not cause the end ring to buckle.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A method for fabricating a motor rotor comprising the steps of:

forming a plurality of substantially parallel electrical current conductors;

insulating each one of the current conductors at least partially from others of the current conductors; and then molding magnetic flux conductive material around at least a portion of each of the plurality of electrical current conductors, the magnetic flux material comprising a composite including metal particles coated with a binder.

2. The method of claim 1, wherein the step of forming the plurality of substantially parallel electrical current conductors comprises attaching rotor bars to rotor end rings.

3. The method of claim 1, wherein the step of forming the plurality of substantially parallel electrical current conductors comprises molding a rotor cage including a plurality of rotor bars and two end rings.

4. The method of claim 1, wherein the rotor bars are coupled to two endrings, and further including the step of applying a support piece over an exposed one of the two endrings prior to molding the magnetic flux conductive material to prevent the molding material from causing the exposed one of the two endrings to buckle.

5. The method of claim 4, wherein the step of molding the magnetic flux conductive material includes using a piston to distribute the magnetic flux conductive material.

6. A motor component comprising:

a plurality of substantially parallel electrical current conductors, each one of the current conductors at least partially insulated from others of the current conductors;

a plurality of slot liners with each slot liner being positioned around a respective one of the current conductors; and magnetic flux conductive material molded around at least a portion of each of the plurality of electrical current conductors and the plurality of slot liners to form a core.

7. The motor component of claim 6, wherein the electrical current conductors comprise copper or aluminum.

8. The motor component of claim 6, wherein the magnetic flux conductive material comprises iron or steel.

9. The motor component of claim 8, wherein the magnetic flux conductive material further includes glass fibers.

10. The motor component of claim 6, wherein each of the electrical current conductors includes at least a portion of a multi-turn wire coil.

11. A motor rotor comprising:

a plurality of substantially parallel electrical current conductors, each one of the current conductors at least partially insulated from others of the current conductors by oxidation, anodization, or an insulation coating each of the electrical current conductors comprising a rotor bar, and further comprising two end rings, each of the rotor bars coupled between the two end rings; and magnetic flux conductive material molded around at least a portion of each of the plurality of electrical current conductors to form a rotor core, the magnetic flux material comprising a composite including metal particles coated with a binder.

12. The motor component of claim 11, wherein each rotor bar is coupled between the two end rings by two respective braze joints.

13. The motor component of claim 11, wherein the rotor bars and the end rings form an integral rotor cage.

14. The method of claim 1, wherein the metal particles are iron powder, iron flakes, steel powder, or steel flakes, and the binder is a polyetherimide resin or a thermosetting material.

15. The method of claim 14, wherein the composite further includes glass fibers.

16. The motor component of claim 6, wherein each slot liner is angled and forms slot overhangs in the molded magnetic flux conductive material.

* * * * *